2 Sheets—Sheet 1.
R. McCULLY.
REGISTERING AND ALARM TICKET-SHEARS.
No. 174,144. Patented Feb. 29, 1876.
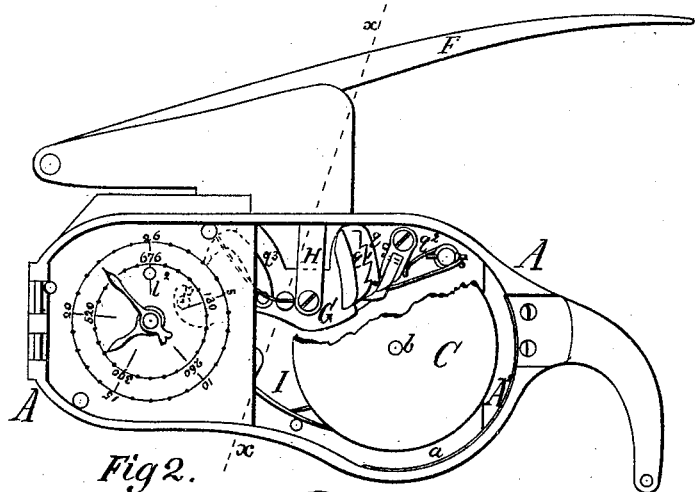
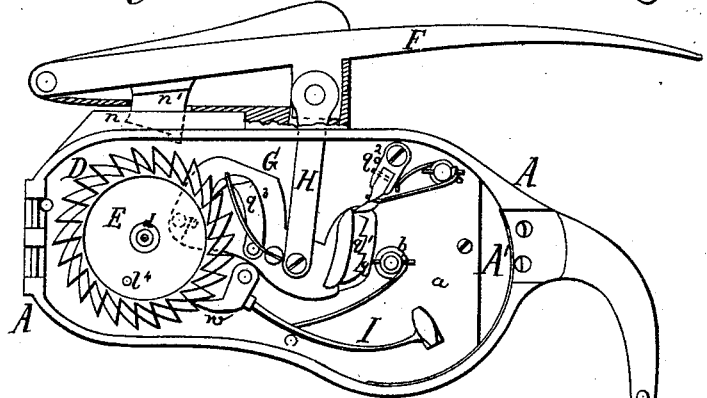
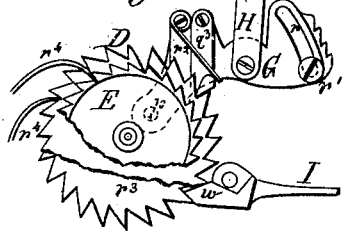
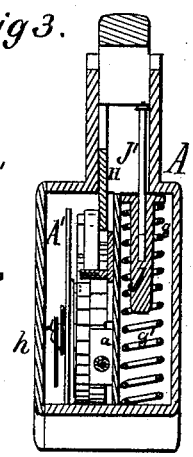
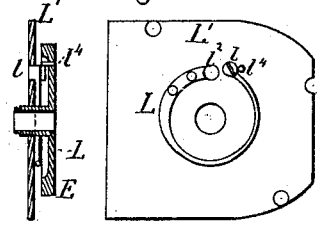
Witnesses:
J. P. Theodore Lang
Jno. S. Slater
Inventor:
Robt. McCully
by
Mason Fenwick & Lawrence
Attys.
N. PETERS, PHOTO-LITHOGRAPHER, WASHINGTON, D. C.

2 Sheets—Sheet 2.

R. McCULLY.
REGISTERING AND ALARM TICKET-SHEARS.

No. 174,144. Patented Feb. 29, 1876.

Witnesses:
J. P. Theodore Lang
Jno. S. Slater

Inventor:
Robt. McCully
by
Mason Fenwick Lawrence
Attys.

UNITED STATES PATENT OFFICE.

ROBERT McCULLY, OF PHILADELPHIA, PENNSYLVANIA.

IMPROVEMENT IN REGISTERING AND ALARM TICKET-SHEARS.

Specification forming part of Letters Patent No. 174,144, dated February 29, 1876; application filed February 15, 1876.

*To all whom it may concern:*

Be it known that I, ROBERT MCCULLY, of Philadelphia, in the county of Philadelphia and State of Pennsylvania, have invented certain new and useful Improvements in Registering and Alarm Ticket - Shears; and I do hereby declare that the following is a full, clear, and exact description of the same, reference being had to the accompanying drawings, forming part of this specification, in which—

Figure 7:
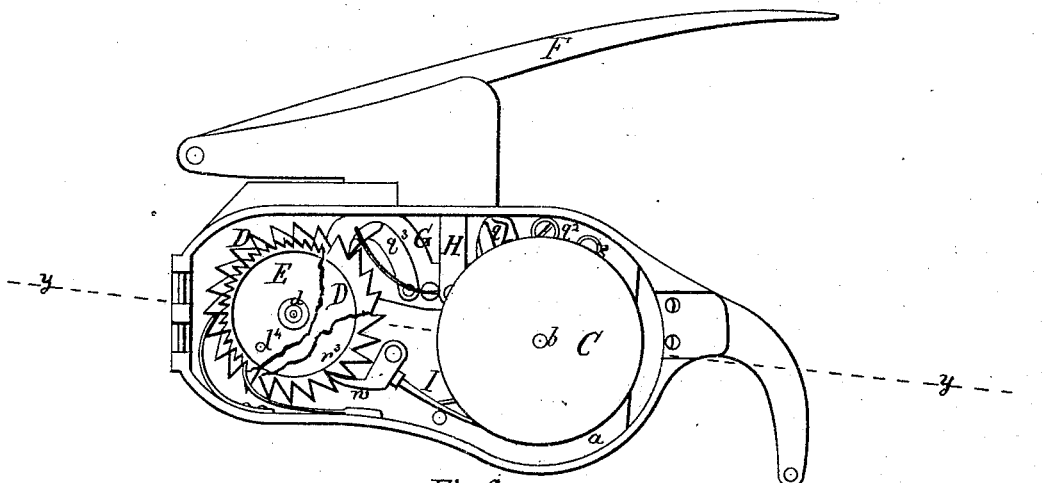
Figure 8:
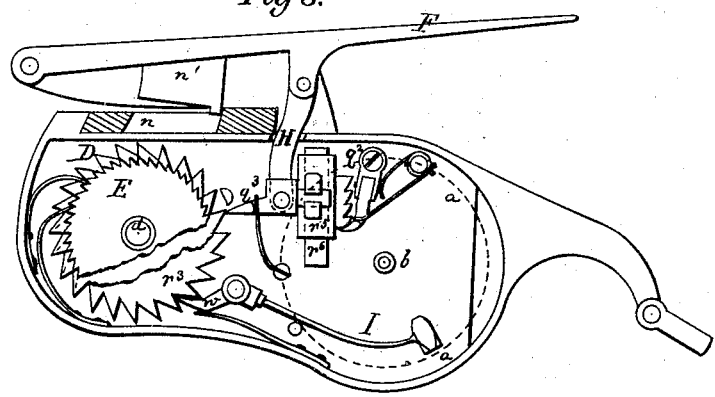
Figure 9:
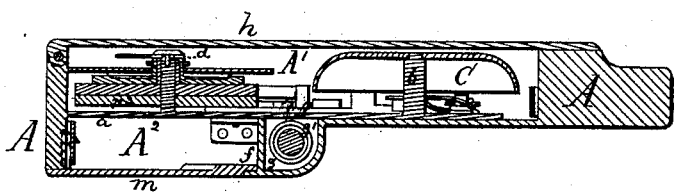

Figure 1 is a side elevation of my invention in its normal condition, one side of the case being removed from its hinge connection and a portion of the alarm-bell broken away, in order to expose the operating mechanism. Fig. 2 is a side elevation and partial section of the apparatus as it appears after it has been operated. In this view the bell is removed, in order to expose the parts in rear of it. Fig. 3 is a vertical cross-section of the apparatus in the line $x\ x$ of Fig. 1. Fig. 4 is a view of the rear side of the dial, showing a tally-indicator. Fig. 5 is a vertical section of the tally-indicator and multiplying-ratchet separate from the apparatus. Fig. 6 is a side elevation showing a modification of the register-ratchets and a portion of the mechanism for operating them, and through one of them the alarm hammer. Fig. 7 is a side elevation of the apparatus shown in Fig. 1, modified by the addition of a third ratchet-wheel for operating the alarm-hammer. Fig. 8 is a side elevation of a modification of the apparatus, showing the hammer operated by one of the ratchet-wheels, and the ratchet-wheels operated by a pawl attached directly to the link of the hand-lever, and the device for preventing an incomplete movement being made with the hand-lever modified so as to slide instead of vibrate. Fig. 9 is a horizontal section in the line $y\ y$ of Fig. 7 of the apparatus shown in Fig. 7.

The apparatus shown in Figs. 1, 2, and 3 is in all respects the same as that shown in Figs. 7 and 9, except that a third ratchet is provided, and the pawl which operates the three ratchets is modified in form to take properly into these ratchets.

This invention relates more especially to the registering alarm ticket-shears patented by me on 18th January, 1876, and is designed to render the operating mechanism thereof more effective, and to simplify the same; but it is not necessarily limited to my patented apparatus, as it will be useful for registering alarm ticket-punches as well as for registering and alarm ticket-shears.

The nature of my invention consists, first and mainly, in combining the hammer with a ratchet-wheel on the arbor of the registering apparatus, and with the hand-lever and pawl or pawls which operate the registering apparatus and alarm-hammer, whereby the power applied to the hand-lever for operating the register causes a ratchet on the arbor of the registering apparatus to operate the alarm-hammer. It consists, second, in the combination of a pawl having two joints, one at right angles to the other, and connected with the hand-lever, and a pawl-carrying and a toothed checking device, as presently described. It consists, third, in the handle of the alarm-hammer being constructed to take into a ratchet-wheel on the arbor of the registering apparatus, so as to be operated by said wheel when it is moved, and after being operated for the purpose of sounding an alarm serve as a detent for said ratchet-wheel. It consists, fourth, in an eccentric indicating-pin on a spring attached to the dial-plate, and arranged in a depression on the upper side of the multiplying-wheel, in combination with a passage through the dial-plate, and with a concentric projection on the multiplying-wheel of the registering apparatus, whereby a tally of the first revolution of the multiplying-wheel is made and indicated before the said wheel commences its second revolution. It consists, fifth, in a concealed spring - chamber with spring in it at the rear end of the chamber for the shearings, and outside of the chamber in which the operating mechanism is placed, and directly under the hand-lever, whereby the movements of the operating mechanism are saved from being interfered with by the spring, and the parts can be arranged to operate as hereinafter described.

In the accompanying drawings, Figures 1, 2, and 3, A represents the case of the apparatus formed with a chamber $A^1$, in which the register and alarm mechanisms are arranged, and a chamber, $A^2$, in which the pieces sheared or punched from tickets are received. These chambers are separated by a vertical arbor and spindle-plate, $a$, in which are inserted the spindle $b$, for the alarm-bell C to rest upon, and the arbor $d$, for the registering-wheels D E to turn upon. This plate also has the pivots and pins of different operating-parts of the apparatus inserted into it, and when it is removed, all the operating-parts are carried with it, except the mainspring, which throws up the handle, and the catches which retain the doors or slides through which the apparatus is inspected. The shearing-chamber $A^2$ is divided into two compartments, one small and the other large, by means of a transverse portion, $f$, and into the small compartment $g$ a spiral spring, $g'$, is placed, as shown in Figs. 3 and 9. In all respects, except this spring-chamber, the case is constructed like the case in my aforesaid patent, granted 1876, it being closed on all sides, and its registering and alarm mechanism and shearing-chambers closed by movable locked side pieces $h$ and $m$, which can only be opened by a special key under control of the inspector. The shearing or punching dies $n$ $n'$ and the hand-lever F are the same as in my aforesaid patent, or as used on implements in use, and occupy the positions shown in the drawing if made in accordance with my patent, which is the plan herein represented. G is an oscillating arm, pivoted to the arbor-plate $a$ at $p$, and connected to the hand-lever F by a link, H, as shown. This arm has ratchet-teeth, $q$, on its free end, and forward of the teeth a shoulder, $q^1$, is formed. The surface of the metal between these teeth and the shoulder is beveled off slightly from bottom to top, so that an easy passage over it is afforded for the double-jointed spring-pawl $q^2$ in its movement from the position shown in Fig. 1 to the position shown in Fig. 2. Between the ends of the oscillating arm a pivoted spring-pawl, $q^3$, is arranged on this arm, and it takes into the unit-registering wheel D and the multiplying registering-wheel E, and operates them in the usual manner, said wheels being constructed in the well-known way or as set forth in my aforesaid patent. I is the spring alarm-hammer. Its handle is terminated in form of a tapering pawl, $w$, which is pivoted to the arbor-plate $a$, and takes into the teeth of the unit ratchet registering-wheel D, as shown in the drawings, so as to be operated by said wheel, and caused to raise the hammer against its spring, for giving an alarm, and, after the alarm is sounded, caused to fall back into a notch of the said wheel and act as a detent for it.

J is a tubular flanged plug inserted into the spring $g'$, and J' is a rod inserted into the plug and extended up to the hand-lever, and fitting a concave socket in the under side of the same. L is a spring, bent into nearly a ring form, fastened by one end to the register-dial L' and occupying a depression on the upper side of the multiplying-wheel E. At the loose end of this spring an indicating-pin, $l$, is applied, said pin occupying a position in close relation to a hole, $l^2$, made through the dial. Just outside of this spring a projection, $l^4$, is formed on the upper side of the multiplying register-ing-wheel E, so as to impinge against the spring at a point which is nearest to the abor of this wheel. The hole through the dial-plate is located at a point which is about equal in distance from the arbor of the wheel E to that which the smallest diameter of the curved spring occupies from said arbor. Now, as the wheel completes its revolution the projection $l^4$ strikes a cam below the pin of the spring and forces the pin $l$ in line with the hole in the dial, and, said spring being relieved of the vertical strain exerted against it by the pin, forces the pin into the whole where it remains, visible on the face of the dial, and indicating that one complete revolution of the multiplying-wheel has been made.

Operation: A ticket or strip of paper being placed under the shears, the lever F is depressed with the hand until all the ratchet-teeth on the free end of the oscillating arm G pass by the double-jointed pawl $q^2$. This depression of the lever causes the ticket to be sheared or punched, and the register-pawl $q^3$ to move the unit ratchet-wheel D the distance of one notch, and simultaneously with this movement the pawl $w$ on the end of the handle of the alarm-hammer I is operated by the unit ratchet-wheel and the hammer thrown up and caused to give an alarm by a blow upon the bell C. The withdrawal of pressure from the hand lever F allows the spring $g$ to throw up the handle, and with it the oscillating arm G and its attachments. This up-movement of the parts restores the same to a position for another operation. The shearings or cuttings from the tickets fall into the chamber $A^2$. This operation continues until all the teeth of the unit-wheel are acted upon, and then the pawl, by means of a deep notch in the unit-wheel, takes the multiplying-wheel and moves it along with the unit-wheel the distance of one tooth; and now the unit-wheel makes a second revolution alone, and again moves the multiplying-wheel the distance of one tooth. This operation continues until the multiplying-wheel makes a revolution, and then the projection $l^4$ moves the pin $l$ on the spring L in line with the hole in the dial, and this pin is forced by the spring through the hole $l^2$, so as to be seen on the face of the dial. The indication made by the pin is marked on the dial 676. This done, the machine can continue its registrations in the same manner as just described until 676 more registrations are made, when its capacity for registering is exhausted. These last registrations are not indicated, but are known from the construction of the apparatus, and may be determined by the shearings, the ticket-check, schedule, or the condition of the pointers of the register. In case the hand-lever should be partly moved down, it cannot be drawn back until the movement is completed, as the teeth on the free end of the oscillating arm prevent such return movement, but when the movement has been a full one, the double pointed pawl is forced by its spring against the shoulder, and in this position the oscillating arm is free to pass by the pawl without obstruction. In the modification shown by Fig. 6, the oscillating arm G is furnished with a segmental slot, $r$, and guiding pin $r^1$, which passes through the slot, and it is also provided with an extra pawl, $r^2$, which moves a third rachet-wheel, $r^3$, on the arbor of the register.

The pawl $r^2$ moves the rachet-wheel $r^3$, and this wheel operates the alarm-hammer. The hammer-pawl acts as a detent to the wheel $r^3$. The register-wheels proper are operated by the pawl $q^3$, and are provided with detents, $r^4 r^4$. In the modification shown in Fig. 7 the pawl $q^3$ is shaped to move the wheel $r^3$ with the unit-wheel, and also to move the multiplying-wheel at the proper time, and the third wheel operates the hammer. The unit and multiplying wheels are provided with detents $r^4 r^4$. The hammer-pawl acts as a detent to the wheel $r^3$. In the modification, Fig. 8, the pawl $q^3$ is attached by a socket and rigidly fastened to the link H of the hand-lever F, and the stop-teeth for the double-jointed pawl are formed on a straight moving piece $r^5$, which is loosely coupled to a heel of the pawl and fitted by a groove in it to slide on a fixed guide, $r^6$, of plate $a$. Thus the pawl is arranged to oscillate while the check-teeth move in a straight line. The third ratchet-wheel for operating the hammer and proper detents for the other ratchet-wheels are provided.

Having thus described my invention, what I claim as new, and desire to secure by Letters Patent, is—

1. The alarm-hammer operated by connections of the hand-lever, and a ratchet-wheel turning on the arbor of the registering apparatus, substantially as and for the purpose set forth.

2. In combination with a hammer operated by connections of the hand-lever and a ratchet-wheel turning on the arbor of the registering apparatus, a pawl-carrying and toothed-checking device and a double-jointed pawl, substantially as and for the purpose set forth.

3. The alarm-hammer having its handle constructed to take into notches between the teeth of a ratchet-wheel on the register-arbor, and to act as a detent to said wheel, substantially as and for the purpose described.

4. The indicating-pin $l$, in combination with the dial and a registering-wheel of the register, substantially as and for the purpose described.

5. The chamber $g$, provided with spring $g'$, constructed and arranged as herein shown, for the purpose described.

In testimony that I claim the foregoing as my own, I hereunto set my hand in presence of two witnesses.

ROBERT McCULLY.

Witnesses:
J. STUART McKNIGHT.
WM. M. McKNIGHT.